US006577815B1

(12) United States Patent
Wu

(10) Patent No.: US 6,577,815 B1
(45) Date of Patent: Jun. 10, 2003

(54) STEAM GENERATING DEVICE FOR USE IN SAUNA

(76) Inventor: Chen Sheng Wu, No. 5, Alley 21, Lane 485, Chung Ming Rd., North District, Taichung city (TW)

(*) Notice: Subject to any disclaimer, the term of this patent is extended or adjusted under 35 U.S.C. 154(b) by 330 days.

(21) Appl. No.: 09/852,038

(22) Filed: May 10, 2001

(51) Int. Cl.[7] ................................ F24F 6/00; B01D 1/00
(52) U.S. Cl. ........................................ 392/402; 392/394
(58) Field of Search ................................ 392/324, 325, 392/333, 336, 337, 394, 403, 404, 449, 451, 452; 261/139, 142; 126/113

(56) References Cited

U.S. PATENT DOCUMENTS 1,866,221 A * 7/1932 Pennington ................. 392/257
3,320,405 A * 5/1967 Costantini et al. .......... 392/394
3,472,455 A * 10/1969 Johnson et al. ............. 126/113
RE33,414 E * 10/1990 Morton ........................ 392/386
5,741,444 A * 4/1998 Kasuli ......................... 261/128
5,758,018 A * 5/1998 Fowler, Jr. .................. 392/402
5,855,823 A * 1/1999 MacGibbon et al. ......... 261/142

* cited by examiner

*Primary Examiner*—Sang Paik
(74) *Attorney, Agent, or Firm*—Rosenberg, Klein & Lee

(57) ABSTRACT

A steam generating device includes a main body in which a tank is received. Two end plates of the body each have an extension portion from a top edge thereof and two notches are defined in two sides of each of the extension portions so that two side panels are respectively engaged with the two respective notches. Each of the panels are easily removed from the main body to access the tank and necessary electric parts. A guide plate extends inclinedly from an inside of the tank and an opening in the tank communicates with a steam outlet tube is located above the guide plate.

6 Claims, 9 Drawing Sheets

STEAM GENERATING DEVICE FOR USE IN SAUNA

FIELD OF THE INVENTION

The present invention relates to a steam generating device that has two side panels easily removed from the main body of the device and an inclined plate is located at the steam outlet for reducing water in the steam.

BACKGROUND OF THE INVENTION

A conventional sauna device for generating steam is shown in FIGS. 1 and 2 and generally includes a rectangular main body 10 which has a horizontal plate 11 and a vertical plate 12 in the main body 10. A steam generating tank 20 received in the space 101 below the horizontal plate 11 in the main body 10 and a steam outlet tube 21 is retained in a groove 111 defined in the horizontal plate 11. The vertical plate 12 extends from the horizontal plate 11 such that an electromagnetic switch and a circuit plate (not shown) are respectively received in two partitions 102, 103 separated by the vertical plate 12. A water inlet tube 22 and a water outlet tube 24 respectively extend from the tank 20, and a steam outlet tube 21 extends from a top of the tank 20. A heater 23 is inserted into the tank 20 and a temperature gauge 25 is located at an underside of the tank 20. A wave release plate 26 is located besides the temperature gauge 25 to eliminate the affection of the water waves hitting on the temperature gauge 25. The maintenance for the device is inconvenient because if the electromagnetic switch and the circuit plate are to be taken out from the main body 10, the whole main body 10 has to be removed from the wall and a top panel 14 is disengaged from the main body 10 to access the electromagnetic switch and the circuit plate. If the tank 20 is to be fixed, a side panel 13 is to be removed. The steam contains a lot of water particles when it goes out from the steam outlet tube 21 and the water particles tend to be condensed and elongate the period required to generate enough steam.

The present invention intends to provide a steam generating device that is easily to proceed maintenance processes.

SUMMARY OF THE INVENTION

In accordance with one aspect of the present invention, there is provided a steam generating device and comprises a main body having two end plates connected two ends of the main body. Each of the end plates has an extension portion which is higher than the two sidewalls. Each of the extension portions of the two end plates has two notches defined in two sides thereof and two side panels each have two ends thereof respectively engaged with the two respective notches of the two end plates. A steam generating tank is received in the main body and has a water inlet tube, a water outlet tube and a steam outlet tube respectively extending from the tank and through the main body. A heater and a temperature gauge are connected to an inside of the tank.

The primary object of the present invention is to provide a sauna device that is easily to access the steam generating tank received in a main body.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
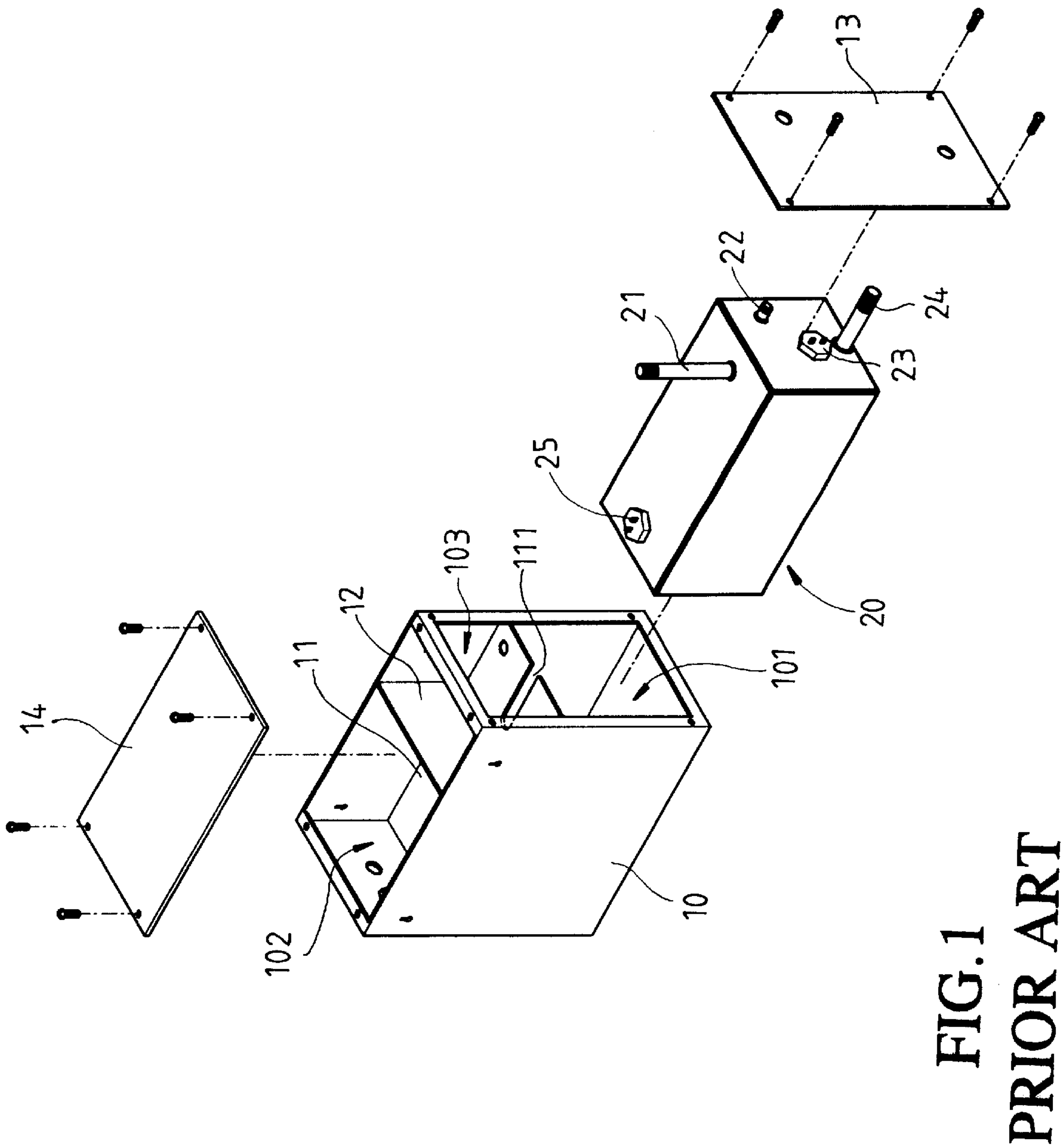
FIG. 1 PRIOR ART
FIG. 1 is an exploded view to show a conventional steam generating device.
Figure 2:
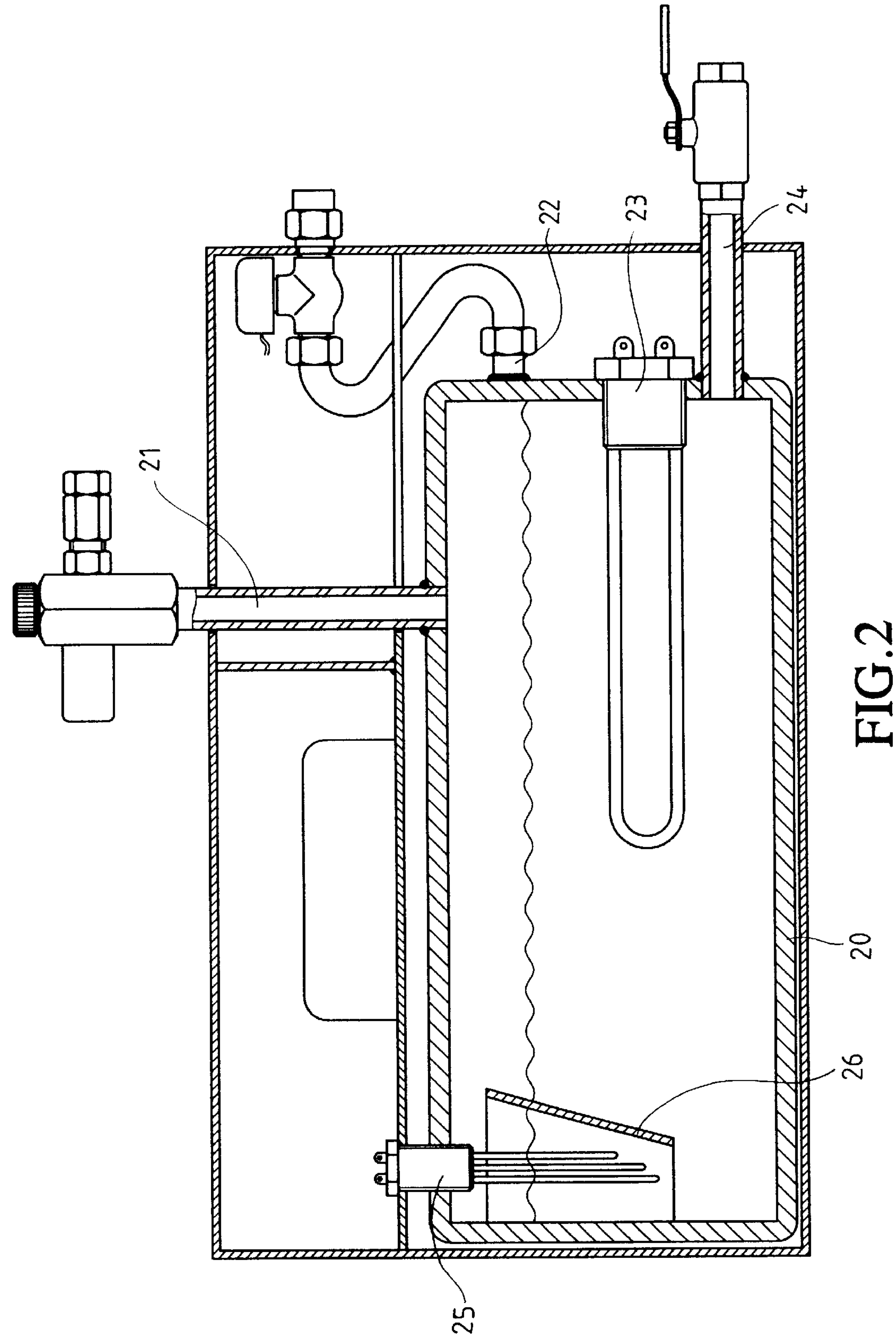
FIG.2 PRIOR ART
FIG. 2 is a cross sectional view to show the conventional steam generating device as shown in FIG. 1.
Figure 3:
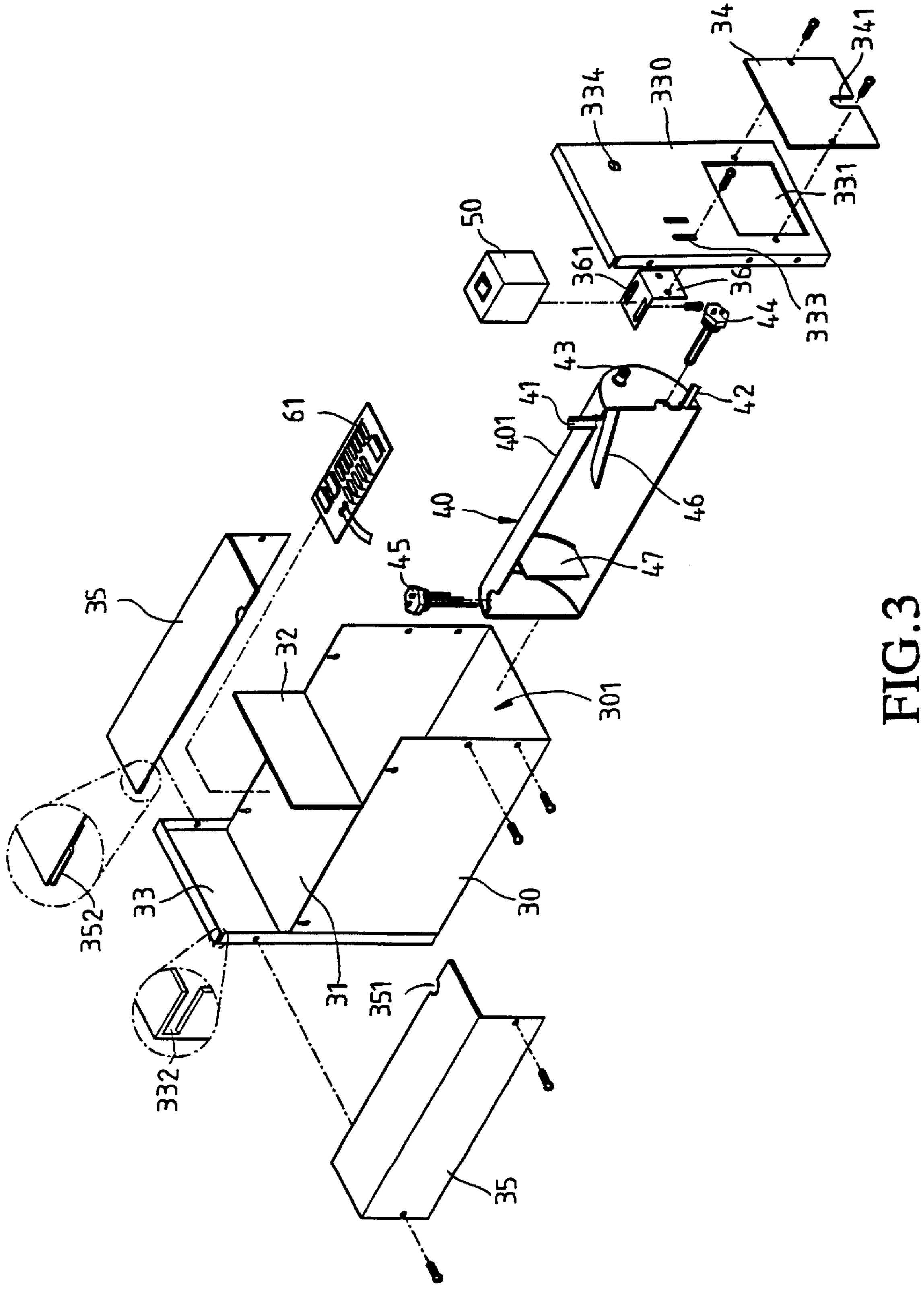
FIG. 3 is an exploded view to show a steam generating device of the present invention.
Figure 4:
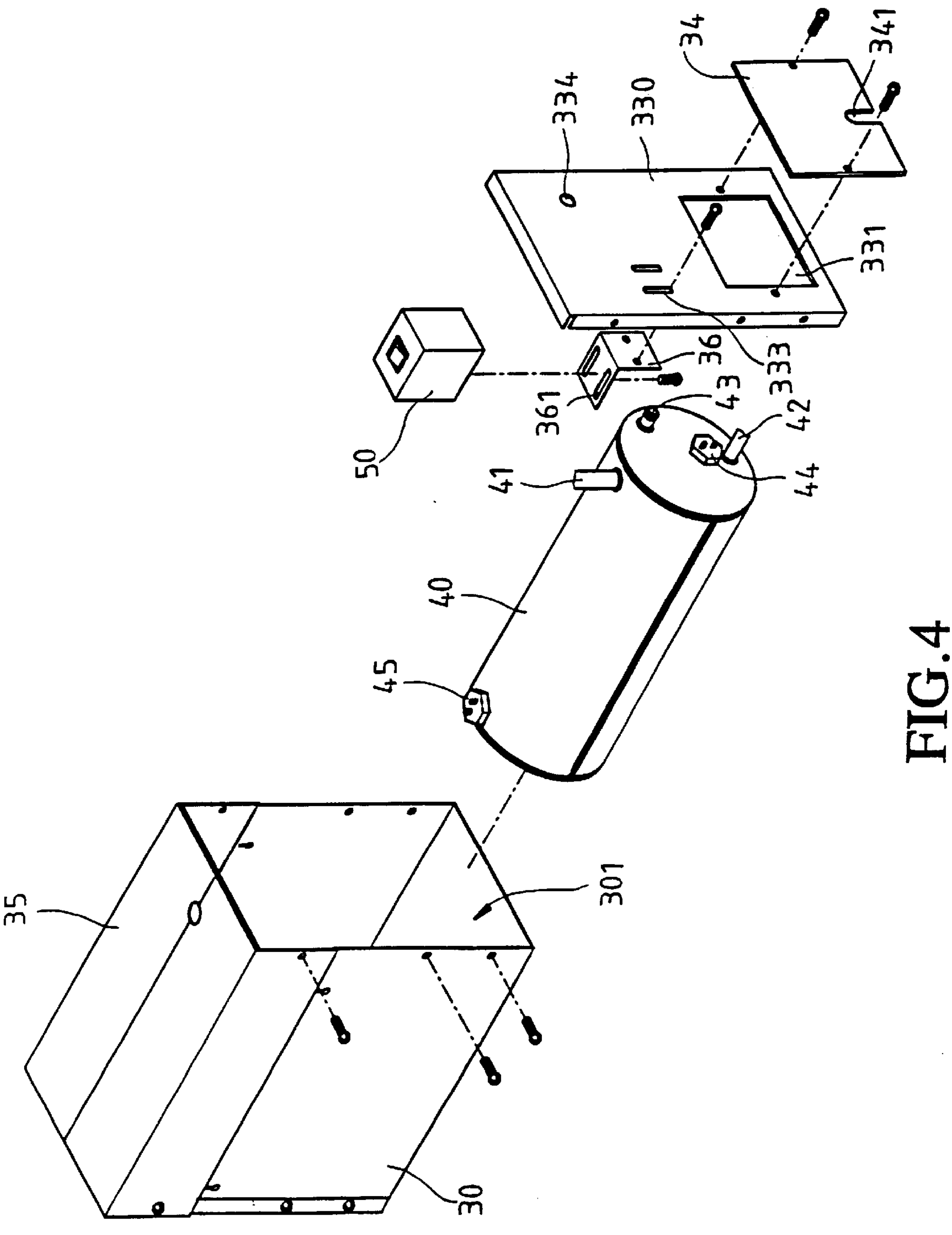
FIG. 4 is an exploded view to show the steam generating device of the present invention wherein the main body is assembled.
Figure 5:
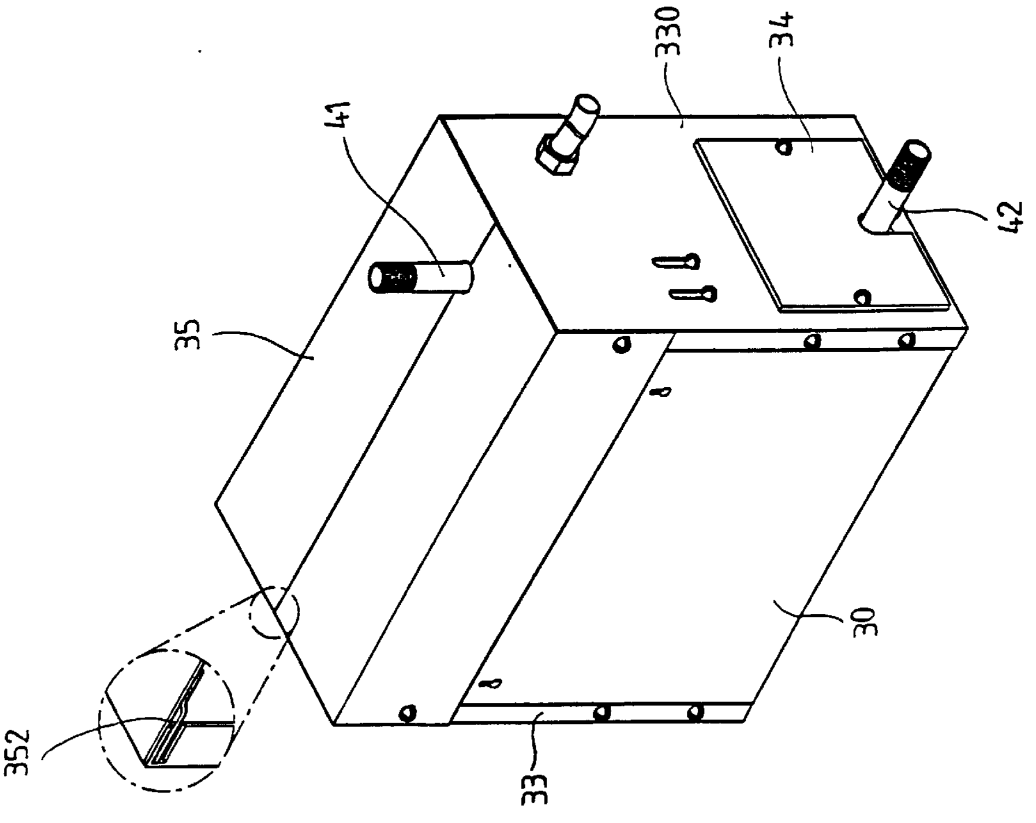
FIG. 5 is a perspective view to show the steam generating device of the present invention.
Figure 6:
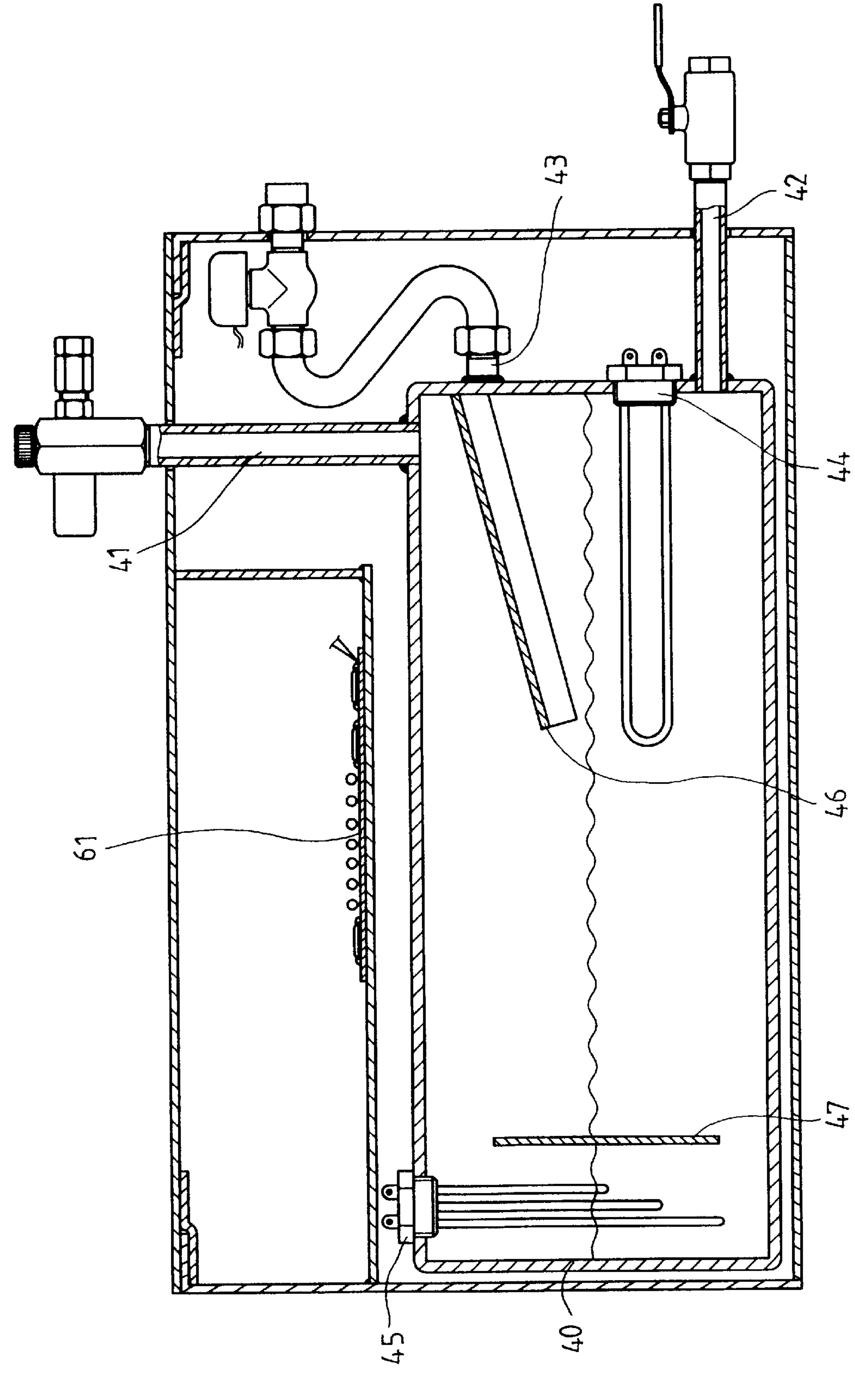
FIG. 6 is a cross sectional view to show the steam generating device of the present invention.
Figure 7:
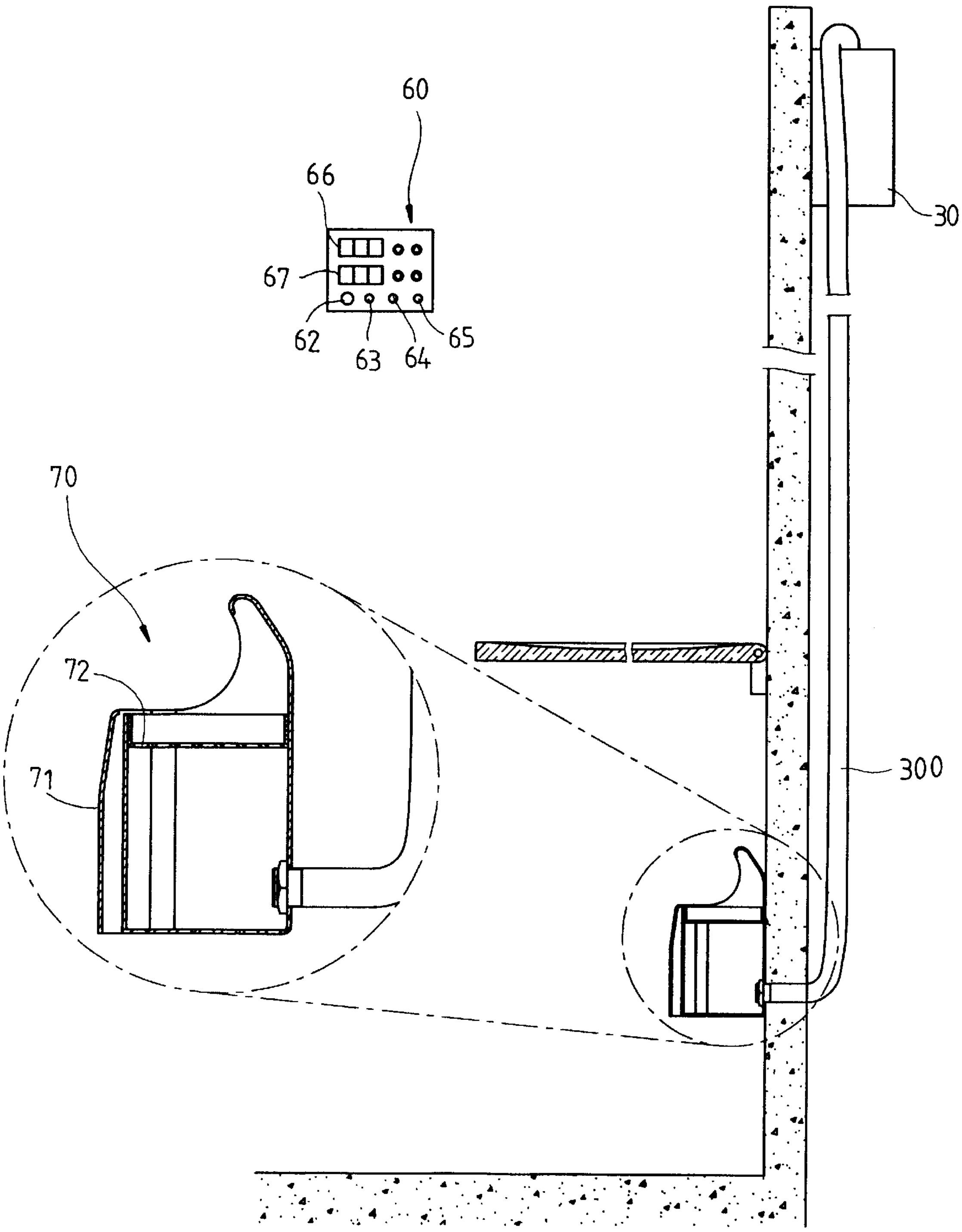
FIG. 7 is an illustrative view to show a basket used in a sauna room.
Figure 8:
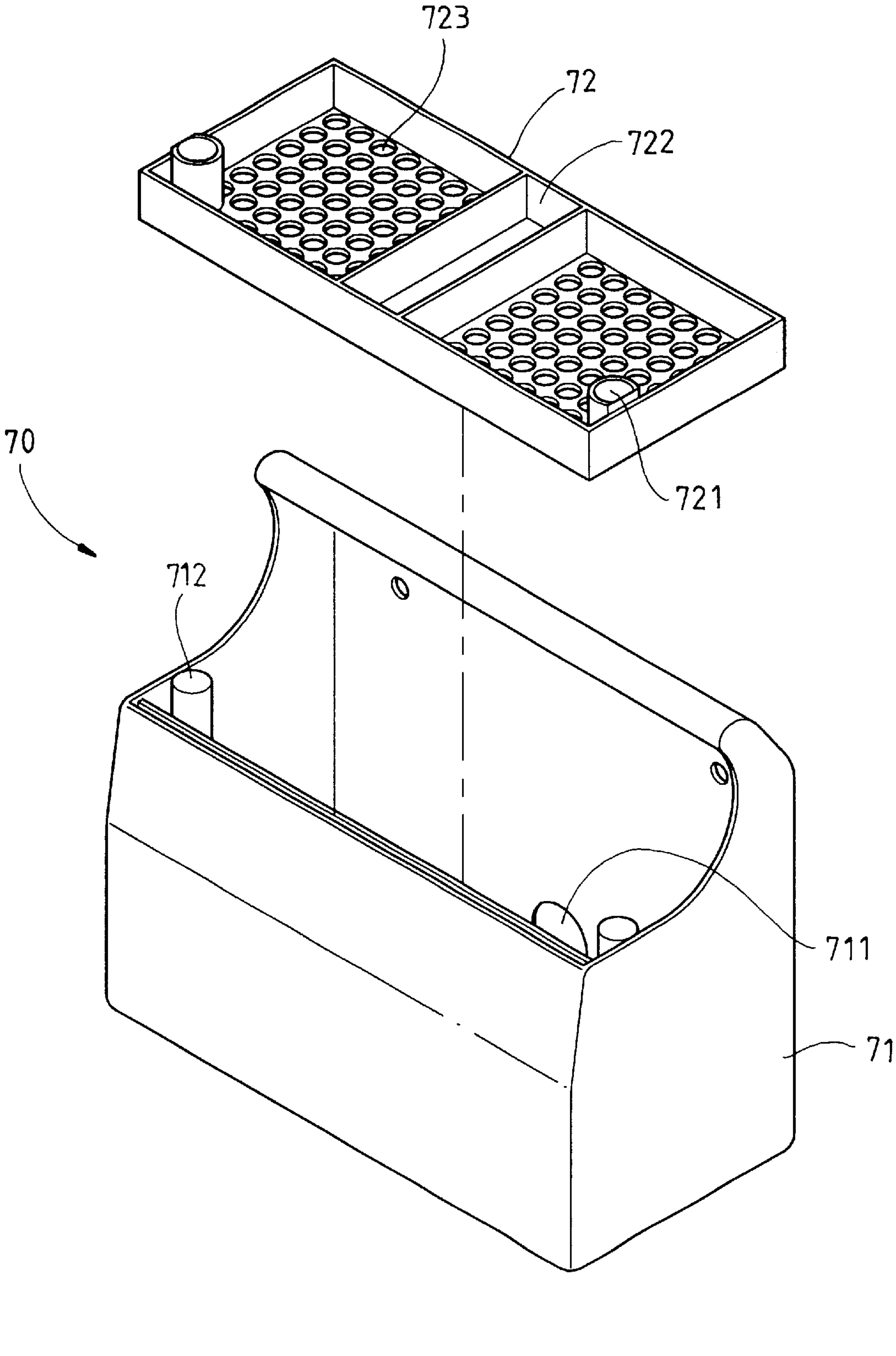
FIG. 8 is an exploded view to show the basket as shown in FIG. 7.
Figure 9:
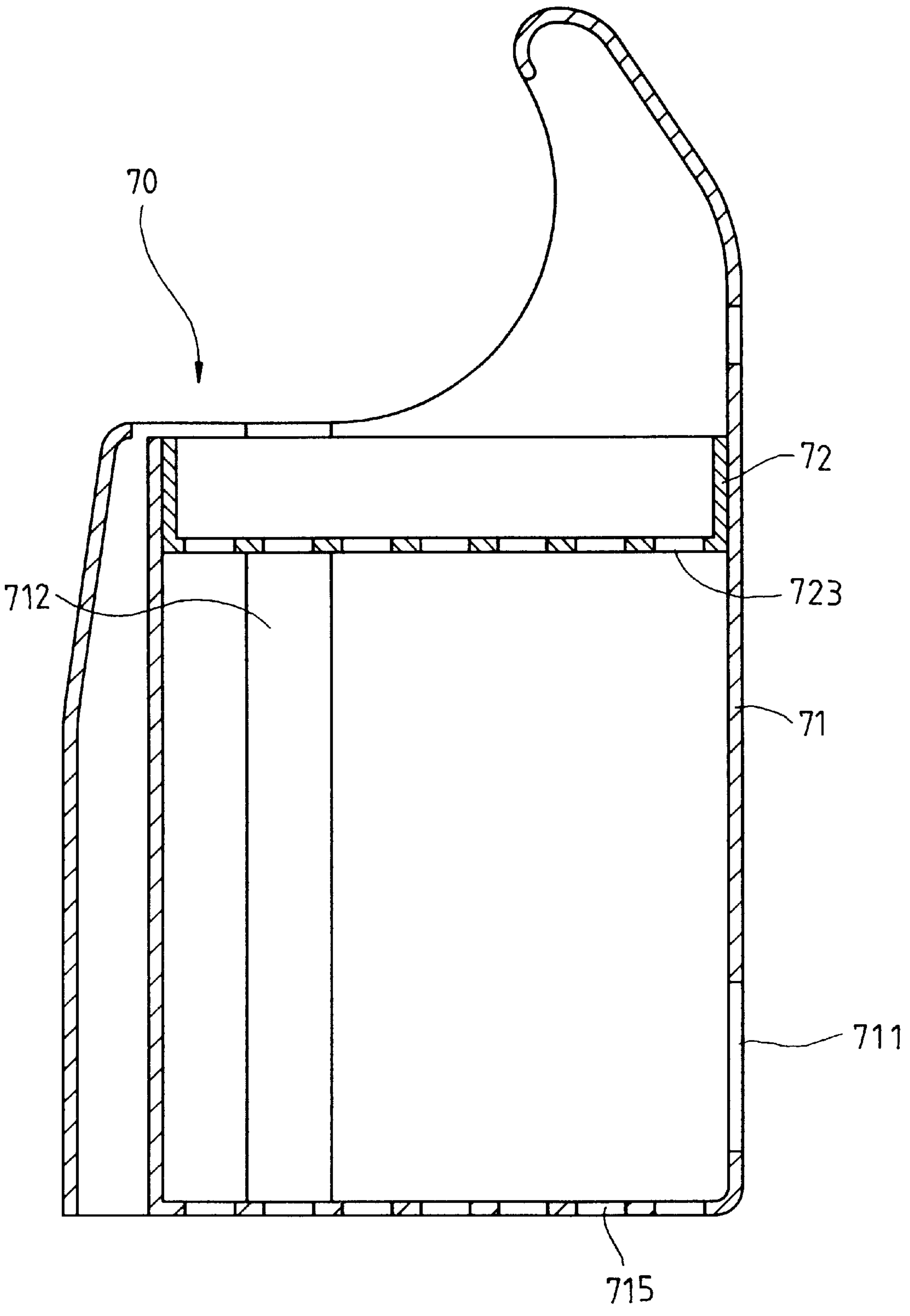
FIG. 9 is a cross sectional view to show the basket as shown in FIG. 7.

Referring to FIGS. 3 to 6, the steam generating device of the present invention comprises a main body 30 having a bottom with two sidewalls and a top 31 connected between the two sidewalls. A first end plate 33 is connected one end of the main body 30 and a second end plate 330 is disengagably connected to the other end of the main body 30, wherein each of the first end plate 33 and the second end plate 330 has an extension portion extending from a top edge thereof. The two extension portions are higher than the two sidewalls. Each of the extension portions of the first end plate 33 and the second end plate 330 has two notches 332 defined in two sides thereof. Two L-shaped side panels 35 each have an insertion plate 352 extending from two ends thereof, the two insertion plate 352 are respectively engaged with the two respective notches 332 of the first end plate 33 and the second end plate 330. A vertical plate 32 extends from the top 31 of the main body 30 so that a circuit board 61 is put on the top 31. The length of the top 3 1 is shorter than a length of the sidewalls.

A steam generating tank 40 is received in the main body 30 and has a water inlet tube 43, a water outlet tube 42 and a steam outlet tube 41 respectively extending from the tank 40 and through the main body 30. A heater 44 and a temperature gauge 45 are connected to an inside of the tank 40. The steam outlet tube 41 extends from the hole composed by two semi-circular recesses 351 in two side panels 35.

The second end plate 330 has two first slots 333 and an L-shaped support member 36 is movably connected to the second end plate 330 by bolts extending through the first slots 333 and engaged with the support member 36. The support member 36 has a horizontal portion in which two second slots 361 are defined. An electromagnetic switch 50 is movably connected on the horizontal portion of the support member 36 by bolts extending through the second slots 361 and engaged with the electromagnetic switch 50. An opening 331 and a hole 334 are defined through the second plate 330, the water inlet tube 43 extends through the hole 334 and a cover 34 is connected to the second end plate 330 and closes the opening 331. A recess 341 is defined in the cover 34 for the water outlet tube 42 extending therethrough.

A guide plate 46 has a first end extending inclinedly from the inside of the tank 40 and a second end of the guide plate 46 extending toward the bottom of the main body 30. An opening in the tank 40 communicating with the steam outlet tube 41 is located above the second end of the guide plate 46 so that a space between the opening in the tank 40 communicating with the steam outlet tube 41 and the guide plate 46 becomes narrower and this may increase the pressure of the steam before it comes out from the steam outlet tube 41. The steam is condensed into water particles which flows into the tank 40 along the inclined guide plate 46 so as to reduce the content of water of the steam flowing out from the steam outlet tube 41. A wave eliminating plate 47 extends from the inside of the tank 40 and is located beside the temperature gauge 45 so as to reduce the impact of the water to the temperature gauge 45. The side panels 35 are easily disengaged from the main body 30 so that the users can easily access the tank 40 and the circuit board 61.

A basket 70 and a control member 60 are hanged on a wall in the sauna room. The control member 60 includes a touch button 62, an operation light 63, a heating light 64, a water out light 65, temperature control buttons 66, and time control buttons 67. The basket 70 has a hole 711 in a rear wall thereof for guiding steam from a pipe 300 connected to the main body 30 in the room, and two rods 712 extend from an inside of a porous bottom of the basket 70. A plate 72 has two tubes 721 in which two rods 712 are received. The plate 72 has a plurality of holes 723 defined therethrough and a recess 722 is defined in the plate 72 so that oil can put in the recess 722.

While we have shown and described the embodiment in accordance with the present invention, it should be clear to those skilled in the art that further embodiments may be made without departing from the scope of the present invention.

What is claimed is:

1. A steam generating device comprising:

a main body having a bottom with two sidewalls and a top, a first end plate connected one end of said main body and a second end plate disengagably connected to the other end of said main body, each of said first end plate and said second end plate having an extension portion which is higher than said two sidewalls, each of said extension portions of said first end plate and said second end plate having two notches defined in two sides thereof, two side panels each having two ends thereof respectively engaged with said two respective notches of said first end plate and said second end plate, and a steam generating tank received in said main body and having a water inlet tube, a water outlet tube and a steam outlet tube respectively extending from said tank and through said main body, a heater and a temperature gauge are connected to an inside of said tank.

2. The device as claimed in claim 1, wherein said second end plate has two first slots and a support member is movably connected to the second end plate by bolts extending through the first slots and engaged with the support member.

3. The device as claimed in claim 2, wherein said support member has a horizontal portion and a horizontal portion in which two second slots are defined.

4. The device as claimed in claim 1, wherein each of said two side panels is an L-shaped member and an insertion plate extends from each of two ends of said two side panels, the two insertion plate respectively engaged with said two respective notches of said first end plate and said second end plate.

5. The device as claimed in claim 1 further comprising a guide plate having a first end extending inclinedly from said inside of said tank and a second end of said guide plate extending toward said bottom of said main body, an opening in said tank communicating with said steam outlet tube located above said second end of said guide plate.

6. The device as claimed in claim 1 further comprising a temperature gauge connected to an inside of said tank and a wave eliminating plate extending from said inside of said tank and located beside said temperature gauge.

* * * * *